(12) United States Patent
Chehanowitz et al.

(10) Patent No.: US 11,989,699 B1
(45) Date of Patent: *May 21, 2024

(54) SYSTEM, METHOD, AND COMPUTER PROGRAM FOR NETWORK EXPERIENCE OPTIMIZATION USING A HOME NETWORK ROUTER

(71) Applicant: Amdocs Development Limited, Limassol (CY)

(72) Inventors: Sarit Chehanowitz, Tel Aviv (IL); Nir Fattal, Yehud-Monosson (IL); Shmuel Ur, Shorashim (IL); Eran Yosef Paran, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,683

(22) Filed: Nov. 2, 2022

Related U.S. Application Data

(63) Continuation of application No. 17/476,369, filed on Sep. 15, 2021, now Pat. No. 11,521,180, which is a
(Continued)

(51) Int. Cl.
*G06Q 10/1093* (2023.01)
*G06Q 10/0631* (2023.01)
(Continued)

(52) U.S. Cl.
CPC ..... *G06Q 10/1095* (2013.01); *G06Q 10/0631* (2013.01); *G06Q 10/06311* (2013.01);
(Continued)

(58) Field of Classification Search
CPC .......... G06Q 10/1095; G06Q 10/0631; G06Q 10/06311; G06Q 10/063118;
(Continued)

(56) References Cited

U.S. PATENT DOCUMENTS 9,838,296 B2    12/2017   Armolavicius et al.
2007/0005409 A1  1/2007   Boss et al.
(Continued)

FOREIGN PATENT DOCUMENTS

CN    106059959 A    10/2016
ES      2462566 A1    5/2014
WO   2009103190 A1    8/2009

OTHER PUBLICATIONS

Cox Communications, "The Homeowner's Guide to Improving WiFi," Cox Communications, Inc., 2020, pp. 1-5, retrieved from https://www.cox.com/residential/internet/guides/improving-wifi/many-devices-on-wifi.html.
(Continued)

*Primary Examiner* — Michael A Keller
(74) *Attorney, Agent, or Firm* — Zilka-Kotab, P.C.

(57) ABSTRACT

As described herein, a system, method, and computer program are provided for network experience optimization using a residential network router. In use, an electronic calendar is accessed by a residential network router. Additionally, the residential network router determines a plurality of events saved to the electronic calendar, wherein the plurality of events require, at least in part, simultaneous network resource (e.g. bandwidth) usage. Further, the plurality of events are prioritized, using the residential network router. Still yet, available network resources are assigned among the plurality of events, using the residential network router, based on the prioritization.

20 Claims, 5 Drawing Sheets

Related U.S. Application Data continuation of application No. 16/991,949, filed on Aug. 12, 2020, now Pat. No. 11,151,520.

(51) Int. Cl.

| | |
|---|---|
| *G06Q 10/10* | (2023.01) |
| *G06Q 10/101* | (2023.01) |
| *G06Q 10/109* | (2023.01) |
| *H04L 12/18* | (2006.01) |
| *H04L 47/70* | (2022.01) |
| *H04L 67/61* | (2022.01) |

(52) U.S. Cl.
CPC ............... *G06Q 10/063118* (2013.01); *G06Q 10/06314* (2013.01); *G06Q 10/10* (2013.01); *G06Q 10/101* (2013.01); *G06Q 10/103* (2013.01); *G06Q 10/109* (2013.01); *G06Q 10/1093* (2013.01); *G06Q 10/1097* (2013.01); *H04L 12/1818* (2013.01); *H04L 47/70* (2013.01); *H04L 67/61* (2022.05)

(58) Field of Classification Search
CPC ............. G06Q 10/06314; G06Q 10/10; G06Q 10/101; G06Q 10/103; G06Q 10/109; G06Q 10/1093; G06Q 10/1097; H04L 12/1818; H04L 47/70; H04L 67/61
See application file for complete search history.

(56) References Cited

U.S. PATENT DOCUMENTS

| | | | |
|---|---|---|---|
| 2010/0100519 A1 | 4/2010 | Aaron et al. | |
| 2013/0238701 A1* | 9/2013 | Lee .................. | H04L 67/10 709/204 |
| 2016/0095132 A1 | 3/2016 | Hodroj et al. | |
| 2016/0294956 A1* | 10/2016 | Fix .................. | H04N 21/26216 |
| 2016/0357642 A1* | 12/2016 | Burshan ............. | G06F 11/2066 |

OTHER PUBLICATIONS

Xfinity, "Personalizing and Controlling Your Home Network with Xfinity xFi," Xfinity, 2020, pp. 1-6, retrieved on Aug. 26, 2020 from https://www.xfinity.com/support/articles/personalize-customize-hnetwork-xfi.

Domanico, A., "Change Your Router's Media Access Control (MAC) Priority Settings: How to," LaptopMag, May 7, 2013, pp. 1-11.

Mackay, J., "How to use Google Calendar to get things done: 31 powerful Google Calendar settings you should be using today," RescueTime:blog, Aug. 4, 2020, pp. 1-32, retrieved from https://blog.rescuetime.com/google-calendar-focus-guide/.

Amdocs, "doxi™ HomeOS & doxi™ Router," Amdocs, 2020, 2 pages, retrieved on Sep. 8, 2020, from https://www.amdocs.com/amdocs-next/doxi-home-os.

International Search Report and Written Opinion from PCT Application No. PCT/IB2021/057312, dated Oct. 28, 2021.

* cited by examiner

US 11,989,699 B1

SYSTEM, METHOD, AND COMPUTER PROGRAM FOR NETWORK EXPERIENCE OPTIMIZATION USING A HOME NETWORK ROUTER

RELATED APPLICATIONS

The present application is a continuation of U.S. application Ser. No. 17/476,369, filed Sep. 15, 2021 and entitled "SYSTEM, METHOD, AND COMPUTER PROGRAM FOR NETWORK EXPERIENCE OPTIMIZATION USING A HOME NETWORK ROUTER," the entire contents of which is incorporated herein by reference.

U.S. application Ser. No. 17/476,369 is a continuation of U.S. application Ser. No. 16/991,949, filed Aug. 12, 2020 and entitled "SYSTEM, METHOD, AND COMPUTER PROGRAM FOR NETWORK EXPERIENCE OPTIMIZATION USING A HOME NETWORK ROUTER," the entire contents of which is incorporated herein by reference.

FIELD OF THE INVENTION

The present invention relates to network access management.

BACKGROUND

Currently, techniques exist to manage network access/connection, such as for approved devices or users, for approved applications or websites, etc. These network access management techniques are often enabled by communication service providers (CSPs) to provide network security. Additionally, techniques exist to predict bandwidth usage, such as for certain applications, certain times of day, etc. These bandwidth usage prediction techniques may be used by CSPs, for example, to offer customers service plans that are in line with their bandwidth usage activity.

However, the aforementioned techniques do not allow for the prioritization of network access, including bandwidth usage, when multiple users and/or devices are simultaneously connecting to a network. There is thus a need for addressing these and/or other issues associated with the prior art.

SUMMARY

As described herein, a system, method, and computer program are provided for network experience optimization using a residential network router. In use, an electronic calendar is accessed by a residential network router. Additionally, the residential network router determines a plurality of events saved to the electronic calendar, wherein the plurality of events require, at least in part, simultaneous network resource usage. Further, the plurality of events are prioritized, using the residential network router. Still yet, available network resources are assigned among the plurality of events, using the residential network router, based on the prioritization.

DETAILED DESCRIPTION

Figure 1:
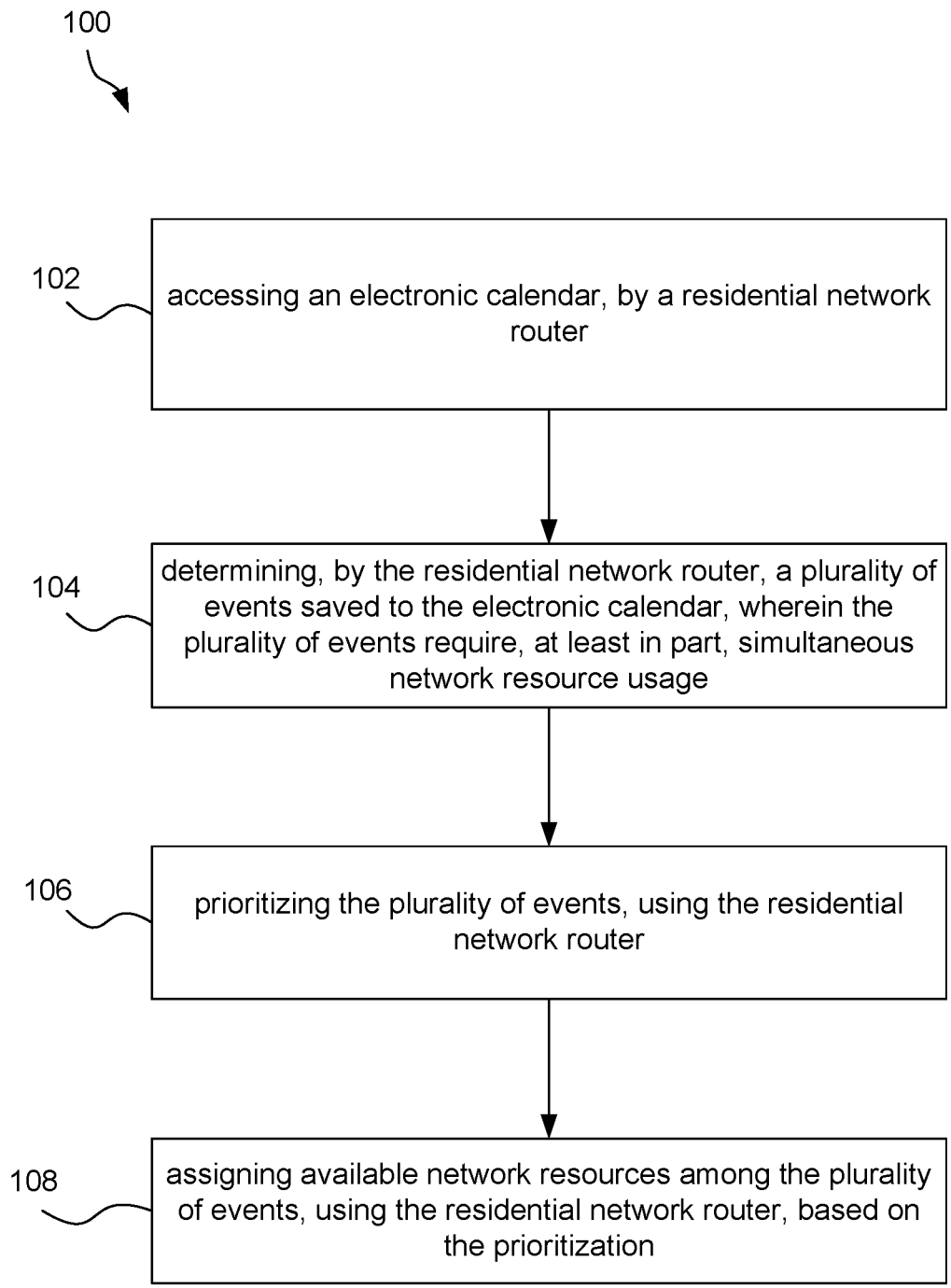
FIG. 1 illustrates a method for providing network experience optimization using a residential network router, in accordance with one embodiment.

FIG. 1 illustrates a method 100 for providing network experience optimization using a residential network router, in accordance with one embodiment. As disclosed, the method 100 is performed by a residential network router that includes software and/or hardware configured to perform the method 100. In this way, the residential network router may be considered a smart router, or a smart home gateway, that is a device which includes functionality beyond that provided by traditional routers.

The residential network router is located in or near a residential space, such as a house, apartment unit, work office, retail or other store, restaurant, or other residential unit or structure. Further, the residential network router is any network router that enables communication between a network (e.g. the Internet) and user devices within and possibly around the residential space. The user devices may communicate with the residential network router via a second network, such as a local area network (LAN). Examples of the user devices are described below with reference to FIGS. 4 and/or 5.

In operation 102, an electronic calendar is accessed. The electronic calendar is any application stored in memory that provides calendar-related functionality. In one embodiment, the electronic calendar may be stored and executed by the residential network router. In another embodiment, the electronic calendar may be stored and executed by a computing device separate from the residential network router, in which case the electronic calendar may be accessed over a network (if required).

The electronic calendar may be accessible to users for creating and saving events thereto, among other calendar-related uses. In one embodiment, the electronic calendar may be shared by the residents of the residential space. In another embodiment, the electronic calendar may combine individual electronic calendars of the residents (or of different households) of the residential space. For example, events created and saved in the individual electronic calendars may be stored in the combined electronic calendar. As a further option, the electronic calendar may also be made accessible to one or more guests of the residential space, by one or more of the residents.

Additionally, in operation 104, a plurality of events saved to the electronic calendar are determined. In the context of the present embodiment, the events require, at least in part, simultaneous network resource usage. In particular, the events may be scheduled during time periods that overlap, at least in part. Further, the events are scheduled to occur at some future point(s) in time.

In one embodiment, the plurality of events may be associated with the residents of the residential space. For example, the events may be created and saved to the electronic calendar by the residents. Each event may indicate one or more of the residents that will participate in the event, or at least may indicate which of the residents created the event.

As noted above, each of the events require network resource usage. The resource may include bandwidth and/or latency, in various embodiments. For example, each event may include (i.e. may occur via) usage of an application that requires network resources. Just by way of example, each event may require sending and receiving communications, data, etc. over a network accessible via the residential network router.

Further, in operation 106, the plurality of events are prioritized. In one embodiment, the prioritizing may be based on a priority assigned to each event, which may be determined from the calendar or may be determined by the residential network router. The priority may be assigned manually (e.g. by a creator of the event), and optionally through a user interface of the electronic calendar (or individual electronic calendars). As another option, the priority may be assigned automatically based on rules and/or a machine learning model (e.g. applied by the residential network router). For example, the priority for an event may be assigned based on a priority predefined for the individual electronic calendar on which the event was created, a priority predefined (e.g. within the residential network router) for the residents of the residential space, a priority predefined (e.g. within the residential network router) for devices of the residents of the residential space that will be used for the events, a priority predefined (e.g. within the residential network router) for certain events, historical priorities assigned to events via the electronic calendar, etc., or any combination thereof.

Still yet, in operation 108, available network resources are assigned among the plurality of events, based on the prioritization. The available network resources may be bandwidth and/or latency, in various embodiments. The available network resources may be determined based on an amount of network resources (supplied by a CSP) to which the residents of the residential space subscribe. As another option, the available network resources may be predicted based on historical network resource usage information indicating available network resources at a particular period of time (e.g. day/time) that corresponds with the period of time over which the events are scheduled.

As noted in operation 104, each of the events requires network resource usage. Thus, an amount of network resources required for each event may be determined. In one embodiment, the amount of network resources required for each event may be determined based on historical resource usage by the same or similar events (optionally at points in time that are similar to the point in time at which the event is scheduled).

In one embodiment, the available network resources may be assigned among the plurality of events by apportioning the available network resources among the events in an order of priority of the plurality of events. Thus, the available network resources may be apportioned to satisfy the network resource required for each event, in order of priority, until the required network resources is satisfied for all events or the available network bandwidth is exhausted (whichever comes first). Then, each event is assigned the portion of the available network resources given to the event during the apportioning.

In this way, events with a highest priority may be assigned sufficient network resources, whereas an event with a lower priority may be assigned insufficient network resources, and remaining events with lowest priority may be assigned no network resources. Of course, this depends on the amount of available network resources and the network resource requirements of the events.

As an option, the method 100 may be performed when an event of the plurality of events is saved to the electronic calendar. This may allow the method 100 to be performed in real-time with respect to the creation of new events on the electronic calendar. Further, when one of the events is assigned an insufficient amount of network resources (or no network resources), the residential network router may cause a notification indicating the insufficient amount of network resources for the event to be presented to the creator of the event or any other participant indicated for the event (e.g. through the electronic calendar). The notification may also include a recommendation of an alternate time to schedule the event when a sufficient amount of network resources for the event exists (e.g. based on network resource requirements of other events saved to the electronic calendar). In another embodiment, the notification may include a recommendation to use network resources provided by a device other than the residential network router, such as via a hotspot.

In any case, for each event, the assigned network resources may be provided to a device for use in association with the event. For example, any device attempting to use the residential network router to participate in the event may be provided with the network resources assigned to that event. In this way, the residential network router may be used to provide network experience optimization by ensuring network resources based on priority.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

For example, while various embodiments described below may refer to network bandwidth specifically, it should be noted that these embodiments may equally apply to other types of network resources, such as latency.

Sometimes, when people are at home, the bandwidth and latency may not be sufficient for each person's purposes. For example, it could be that for one person's game more bandwidth is required than is available at the time. When multiple devices are connected to their residential network router for different purposes (e.g. video calls, gaming, content streaming, etc.), the bandwidth may not be sufficient to accommodate all of those uses simultaneously.

A smart home gateway can be used to manage the devices, to pause and unpause them, etc. In addition, different devices may be given different priority with regard to bandwidth usage. For example, an internet protocol (IP) phone may have higher priority than a television. However, there is still a need to ensure that, for a scheduled event (i.e. activity) requiring network bandwidth usage, sufficient bandwidth is available and ultimately provided. There is also a need help manage event planning, particularly when insufficient network bandwidth will be available.

The embodiments described below provide network experience optimization, as it relates to events requiring network bandwidth, using a residential network router (smart home gateway). The residential network router may have visibility (artificial intelligence based) with regard to who's using what device within a residential space, which means that the residential network router may know the residents, what they are doing on the internet (to some extent), and even where they are located. For example, a user device, such as a smart phone, may be defined in the router as belonging to a particular resident, and a location of the user device within the residential space may be determined (e.g. based on which repeater it uses in which room), such that a location of the resident may be determined with a high likelihood.

For the residential network router to know the residents and their devices, someone may have to define this information in the router. A wizard may be provided by the residential network router that helps to define this information, and it can also ask for age and gender and any other information. This information case be used by the residential network router in some of the embodiments described below.

Figure 2:
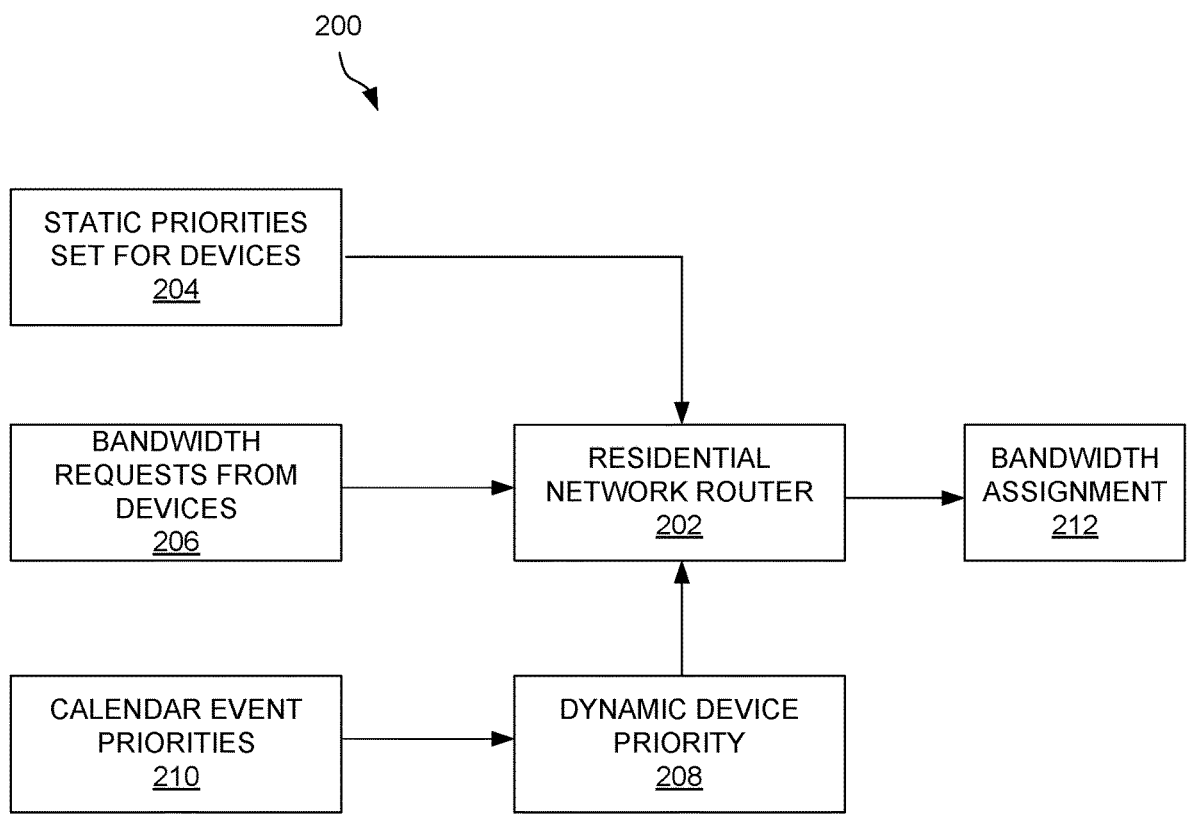
FIG. 2 illustrates a block diagram of a method of a residential network router for using an electronic calendar to assign available network bandwidth among a plurality of events that require, at least in part, simultaneous network bandwidth usage, in accordance with one embodiment.

FIG. 2 illustrates a block diagram of a method 200 of a residential network router for using an electronic calendar to assign available network bandwidth among a plurality of events that require, at least in part, simultaneous network bandwidth usage, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

As shown, a residential network router 202 collects static priorities set for user devices 204 (e.g. via a user interface of the residential network router 202, as described above), bandwidth requests received from the user devices 206 (e.g. for particular uses), and dynamic device priority information 208 determined from calendar event priorities 210. The residential network router 202 processes this information to provide bandwidth assignments 212 to the user devices for use in association with particular calendared events and optionally for other uses.

For the bandwidth requests received from the user devices 206, a user interface may be provided for submitting such bandwidth requests for particular activities. This capability may include marking an activity as one that asks the residential network router 202 to supply the correct bandwidth even at the expense of other activities.

To this end, a dynamic, calendar-based, bandwidth prioritization may be provided by the residential network router 202. In one embodiment, the residential network router 202 may learn to associate certain devices with certain activities. For example, over time, the residential network router 202 can see which activity is done on what devices (e.g. by seeing the correlation between network activity and calendar entries). In another embodiment, devices may be prioritized based on calendar priority. If an activity has priority in the calendar, the residential network router 202 may ensure that the device which performs the activity has the right bandwidth/priority for that activity.

Figure 3:
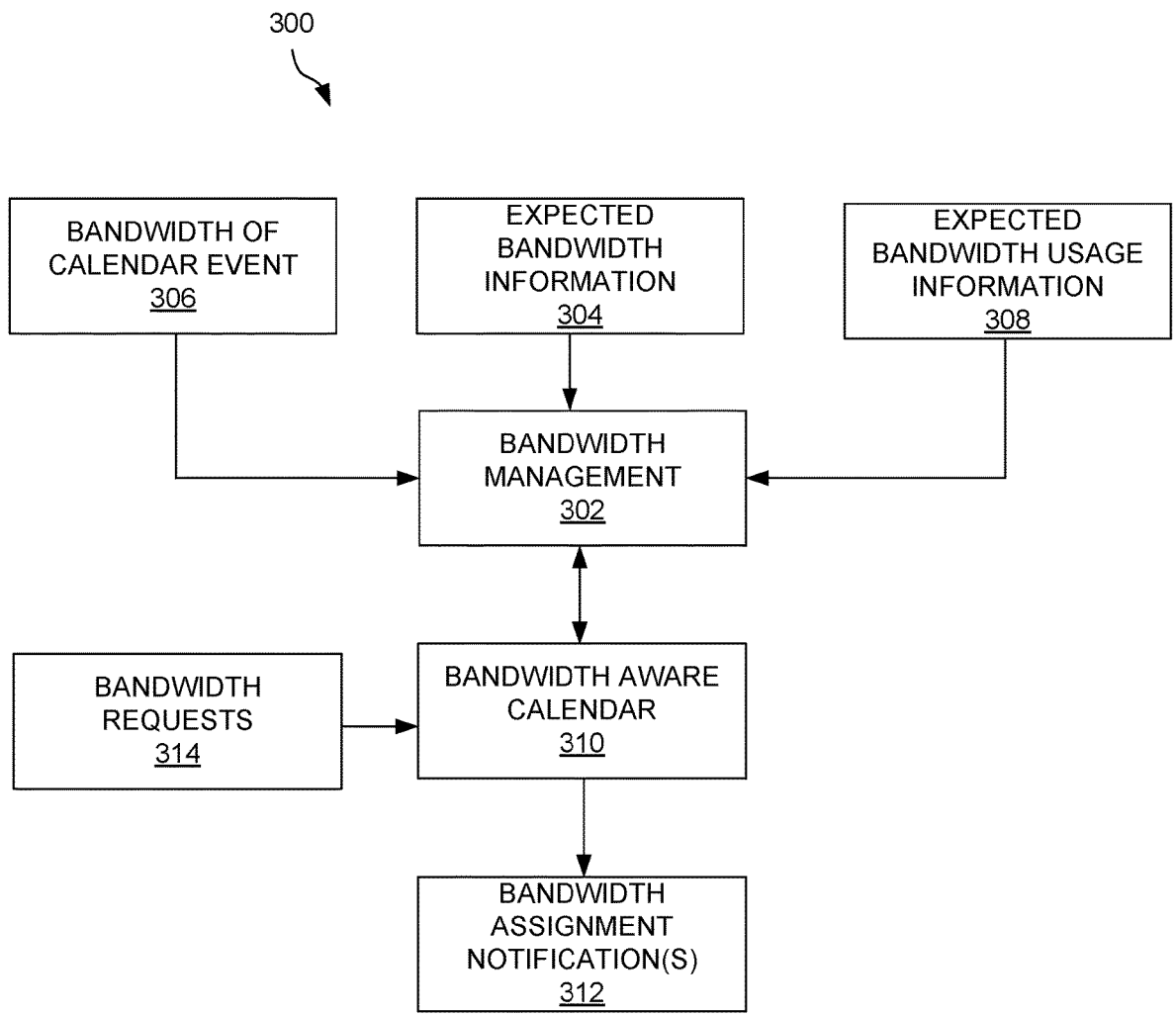
FIG. 3 illustrates a bock diagram of a method of an electronic calendar used by a residential network router for providing network experience optimization, in accordance with one embodiment.

FIG. 3 illustrates a bock diagram of a method 300 of an electronic calendar used by a residential network router for providing network experience optimization, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

As shown, an electronic calendar 310 (i.e. bandwidth aware calendar 310) communicates with a bandwidth management application 302 (e.g. installed on the residential network router). The bandwidth aware calendar 310 may be installed on the residential network router and made accessible through a web interface, for example, or may be installed on a computer system separate from the residential network router.

The bandwidth aware calendar 310, through a user interface of the bandwidth aware calendar 310, a definition of an event to save to the electronic calendar, where the event requires, at least in part, network bandwidth (or other resource) usage. The electronic calendar 310 then saves the event. The bandwidth aware calendar 310 further determines a priority of the event. The priority may be manually assigned to the event (e.g. using the user interface of the bandwidth aware calendar 310). For example, the priority may be included with the definition of the event, and thus manually assigned by a creator of the event. In another embodiment, the priority may be assigned automatically based on rules and/or a machine learning model. The priority of the event is then provided by the bandwidth aware calendar 310 to the bandwidth management application 302 for use in assigning available network bandwidth (or other resources) to the event.

The bandwidth management application 302 (e.g. installed on the residential network router) collects information including expected bandwidth information 304, bandwidth of a calendared event 306, and expected bandwidth usage information 308. The bandwidth management application 302 processes this information and causes the bandwidth aware calendar 310 to present one or more bandwidth assignment notifications 312.

In particular, the bandwidth management application 302 may provide to the bandwidth aware calendar 310 an indication of an amount of the available network resources assigned to the event. The bandwidth aware calendar 310 then presents a notification associated with the indication of the amount of the available network resources assigned to the event, such as an indication of whether the amount of the available network resources assigned to the event is sufficient for the network resource usage required by the event. When the amount of the available network resources assigned to the event is insufficient for the network resource usage required by the event, the notification may also include a recommendation of an alternate time to schedule the event when a sufficient amount of network resources for the event exists and/or a recommendation to use network resources provided by a device other than the residential network router.

Of course, it should be noted that the bandwidth assignment notifications 312 may include warnings and suggestions presented on the bandwidth aware calendar 310 and/or presented through the bandwidth aware calendar 310 on individual resident calendars. For example, when a resident schedules an activity through the bandwidth aware calendar 310 that is of a type that requires bandwidth, the calendar may be marked with times when there is sufficient and insufficient bandwidth for that activity.

As another example, when a resident schedules an activity for a particular time period through the bandwidth aware calendar 310, the resident may be notified if sufficient bandwidth is available during that time period. As another example, the bandwidth aware calendar 310 may be marked with a quality of expected bandwidth during the scheduled time period (e.g. due to availability and other home usages), so that the resident can decide when to schedule the activity.

In another embodiment, warning may be given when changes are made. For example, if another resident sets a higher priority activity which results in an insufficient bandwidth availability for a previously scheduled activity, a warning may be issued regarding the insufficient bandwidth availability. As another example, if outside events change the prediction of available network bandwidth for the residential space that will result in insufficient bandwidth availability for a previously scheduled activity, a warning may be issued. As another example, for activities that can use bandwidth not of the residential network router (e.g. using a smart phone as a hotspot), a warning may be issued that the resident should use the hot spot for a better connection at a specific point in time.

To this end, bandwidth management application 302 will be connected to the calendar 310 and will communicate to the residents the level of bandwidth and the expected experience the resident will have at certain time periods and will recommend an action or an offering that will make their experience better. For example, for a high priority video conference scheduled on the calendar 310, the bandwidth management application 302 may alert that the experience may be negatively impacted by insufficient network bandwidth availability and an offer to purchase more bandwidth (e.g. through a CSP) may be provided. The bandwidth management application 302 will manage the bandwidth according to priorities and will try to ensure that the higher priority events will receive sufficient bandwidth.

For guests of the residential space, a visitation time of the guest may be created in the calendar 310. This may allow an amount of bandwidth to be assigned to a device of the guests, based on a priority determined (manually or automatically) for the guest visit. In another embodiment, a guest device (which is unknown to the router) may be assigned a default priority (e.g. manually defined in the router by a resident). In yet another embodiment, the guest may add his calendar to the router which can then be approved by a resident. In this case, the guest may be then be treated as resident by the router.

As another option, the calendar 310 may provide an option for assured bandwidth. In this case, the bandwidth management application 302 may provide, at a cost, additional bandwidth (e.g. via the CSP). For example, there could be a program in which for 10 hours a month you could ask for more bandwidth, or you can buy it on the fly. In such case, the bandwidth management application 302 will also manage when to get additional bandwidth.

Figure 4:
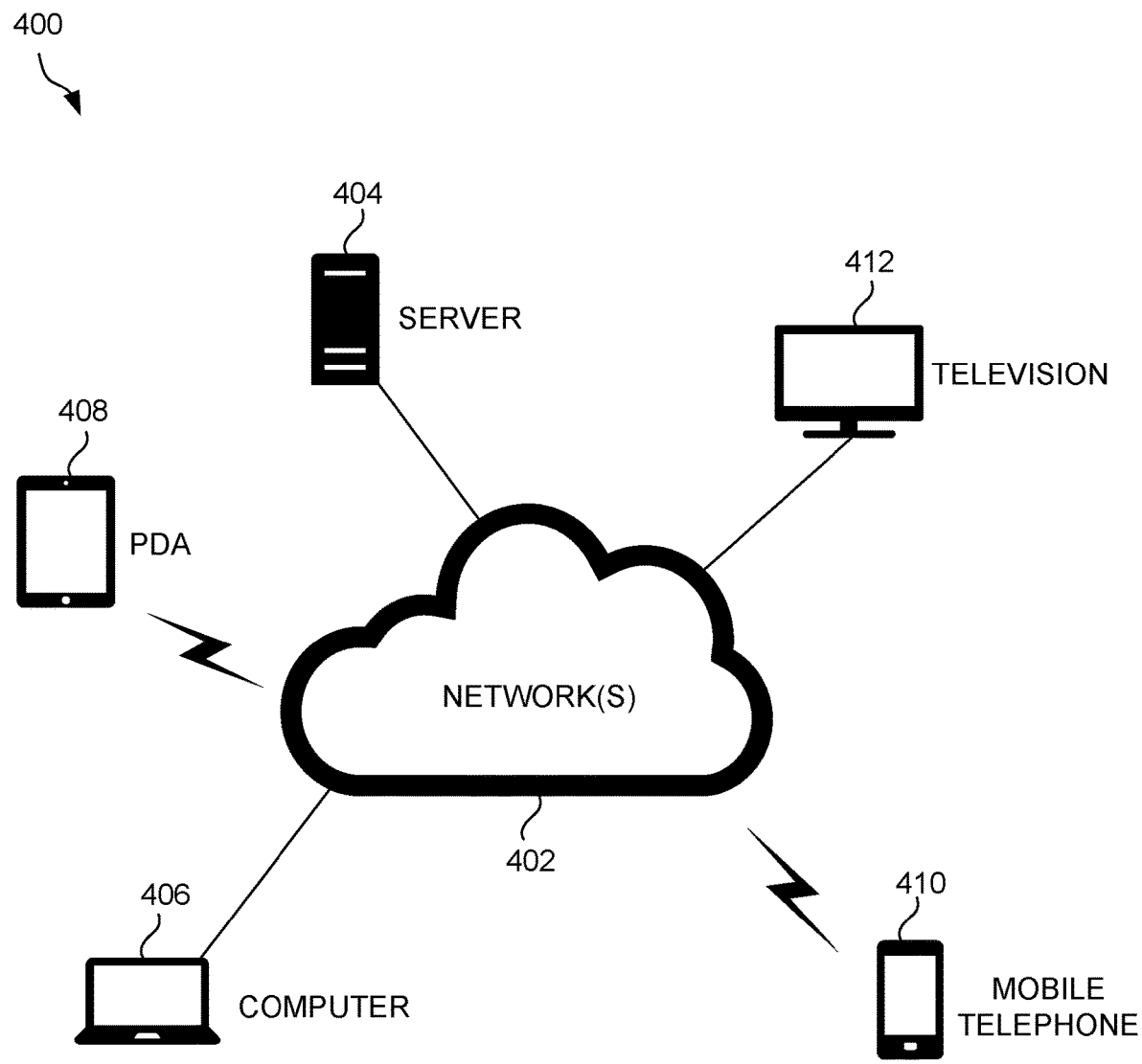
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
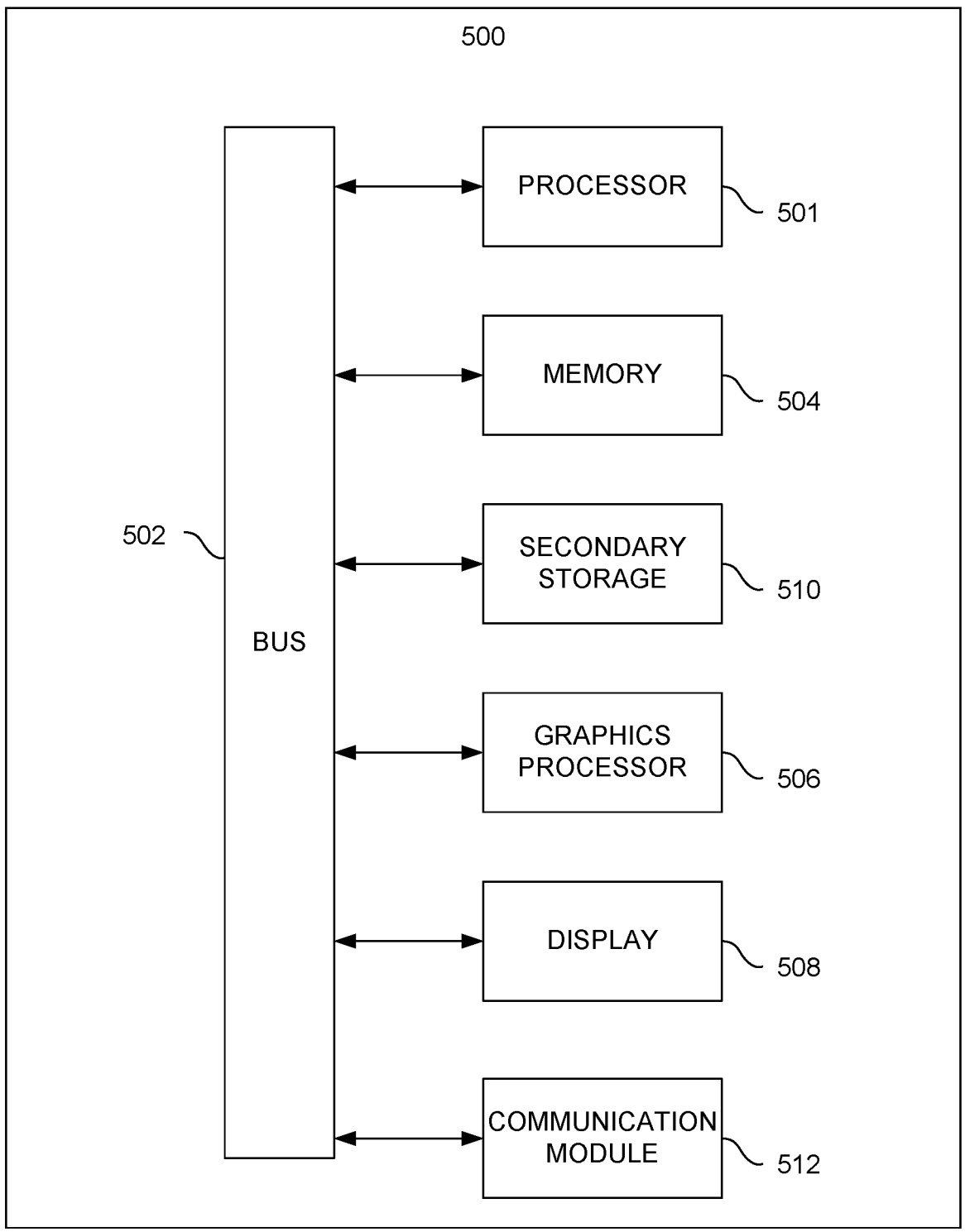
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the FIGS. described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   accessing an electronic calendar, by a residential network router;
   determining, by the residential network router, a plurality of events saved to the electronic calendar, wherein the plurality of events require, at least in part, simultaneous network resource usage;
   prioritizing the plurality of events, using the residential network router, wherein the prioritizing is based on a priority assigned to each event of the plurality of events, and wherein at least one of:
   the priority is determined from the calendar,
   the priority is assigned automatically based on rules, or
   the priority is assigned automatically based on a machine learning model; and
   assigning available network resources among the plurality of events, using the residential network router, based on the prioritization.

2. The non-transitory computer readable medium of claim 1, wherein the plurality of events are associated with residents of a residential space having the residential network router.

3. The non-transitory computer readable medium of claim 2, wherein the electronic calendar is shared by the residents of the residential space.

4. The non-transitory computer readable medium of claim 2, wherein the electronic calendar combines individual electronic calendars of the residents of the residential space.

5. The non-transitory computer readable medium of claim 3, wherein the electronic calendar is made accessible to one or more guests of the residential space, by one or more of the residents of the residential space.

6. The non-transitory computer readable medium of claim 2, wherein the plurality of events are saved to the electronic calendar by the residents of the residential space.

7. The non-transitory computer readable medium of claim 1, wherein some event of the plurality of events includes usage of an application that requires network resources.

8. The non-transitory computer readable medium of claim 1, wherein the network resource usage and the available network resources correspond with at least one of bandwidth or latency.

9. The non-transitory computer readable medium of claim 1, wherein assigning available network resources among the plurality of events includes:

apportioning the available network resources among the plurality of events in an order of priority of the plurality of events, and assigning each event of the plurality of events the portion of the available network resources given to the event during the apportioning.

10. The non-transitory computer readable medium of claim 1, further comprising:

for each event of the plurality of events, providing the assigned network resources to a device for use in association with the event.

11. The non-transitory computer readable medium of claim 1, wherein the method is performed when an event of the plurality of events is saved to the electronic calendar.

12. The non-transitory computer readable medium of claim 1, further comprising:

determining that one of the plurality of events is assigned an insufficient amount of network resources, and causing presentation of a notification indicating the insufficient amount of network resources for the one of the plurality of events.

13. The non-transitory computer readable medium of claim 12, wherein the notification further includes a recommendation of an alternate time to schedule the one of the plurality of events when a sufficient amount of network resources for the one of the plurality of events exists.

14. The non-transitory computer readable medium of claim 12, wherein the notification further includes a recommendation to use network resources provided by a device other than the residential network router.

15. A method, comprising:

accessing an electronic calendar, by a residential network router;

determining, by the residential network router, a plurality of events saved to the electronic calendar, wherein the plurality of events require, at least in part, simultaneous network resource usage;

prioritizing the plurality of events, using the residential network router, wherein the prioritizing is based on a priority assigned to each event of the plurality of events, and wherein at least one of:

the priority is determined from the calendar, the priority is assigned automatically based on rules, or the priority is assigned automatically based on a machine learning model; and assigning available network resources among the plurality of events, using the residential network router, based on the prioritization.

16. A residential network router system, comprising:

a non-transitory memory storing instructions; and one or more processors in communication with the non-transitory memory that execute the instructions to perform a method comprising:

accessing an electronic calendar;

determining a plurality of events saved to the electronic calendar, wherein the plurality of events require, at least in part, simultaneous network resource usage;

prioritizing the plurality of events; and assigning available network resources among the plurality of events, based on the prioritization;

wherein the residential network router system is included in a residential space having a plurality of residents, and wherein the plurality of events are associated with the residents of the residential space.

17. A non-transitory computer readable medium storing computer code executable by a processor to perform a method comprising:

receiving, through a user interface of an electronic calendar, a definition of an event to save to the electronic calendar, wherein the event requires, at least in part, network resource usage;

saving, by the electronic calendar, the event;

determining, by the electronic calendar, a priority of the event, wherein the priority is one of:

manually assigned to the event, using the user interface of the electronic calendar, manually assigned by a creator of the event, or assigned automatically based on at least one of rules and a machine learning model;

providing, by the electronic calendar, the priority of the event to a residential network router for use in assigning available network resources to the event.

18. The transitory computer readable medium of claim 17, further comprising:

receiving, by the electronic calendar from the residential network router, an indication of an amount of the available network resources assigned to the event, and presenting, by the electronic calendar, a notification associated with the indication of the amount of the available network resources assigned to the event.

19. The transitory computer readable medium of claim 18, wherein the notification indicates whether the amount of the available network resources assigned to the event is sufficient for the network resource usage required by the event.

20. The transitory computer readable medium of claim 19, wherein when the residential network router indicates that the amount of the available network resources assigned to the event is insufficient for the network resource usage required by the event, the notification further includes at least one of:

a recommendation of an alternate time to schedule the event when a sufficient amount of network resources for the event exists, or a recommendation to use network resources provided by a device other than the residential network router.

* * * * *